(12) United States Patent
Klemm

(10) Patent No.: US 7,828,876 B2
(45) Date of Patent: Nov. 9, 2010

(54) SYSTEMS AND METHODS FOR ORGANIC PARTICULATE FILTRATION

(75) Inventor: Gerry E. Klemm, Marietta, GA (US)

(73) Assignee: Southern Company, Atlanta, GA (US)

( * ) Notice: Subject to any disclaimer, the term of this patent is extended or adjusted under 35 U.S.C. 154(b) by 347 days.

(21) Appl. No.: 12/106,675

(22) Filed: Apr. 21, 2008

(65) Prior Publication Data

US 2008/0257148 A1    Oct. 23, 2008

Related U.S. Application Data

(60) Provisional application No. 60/912,992, filed on Apr. 20, 2007.

(51) Int. Cl.
*B03C 3/88* (2006.01)
(52) U.S. Cl. .................. 95/76; 55/424; 55/426; 55/427; 55/428; 95/78; 95/60
(58) Field of Classification Search ............ 96/32, 96/60, 62; 95/76, 78; 55/424–428
See application file for complete search history.

(56) References Cited

U.S. PATENT DOCUMENTS

| | | | | |
|---|---|---|---|---|
| 1,509,911 | A * | 9/1924 | Stebbins | 55/413 |
| 1,541,117 | A | 6/1925 | Cochran | |
| 1,603,878 | A * | 10/1926 | Smith | 55/428 |
| 1,777,957 | A | 10/1930 | Bomcke | |
| 1,888,606 | A * | 11/1932 | Nesbit | 95/57 |
| 2,059,814 | A | 11/1936 | Schneider et al. | |
| 2,075,337 | A | 3/1937 | Burnaugh | |
| 2,244,936 | A | 6/1941 | Bird | |
| 2,322,414 | A * | 6/1943 | Bowen | 55/396 |
| 2,581,134 | A | 1/1952 | Odell | |
| 2,700,429 | A | 1/1955 | Wintermute | |
| 2,894,599 | A * | 7/1959 | Leininger | 55/325 |
| 2,955,878 | A | 10/1960 | Tolman | |
| 2,983,333 | A | 5/1961 | Percevaut | |
| 3,392,513 | A * | 7/1968 | Hedin | 55/425 |
| 3,516,648 | A | 6/1970 | Biederman, Jr. | |
| 3,620,282 | A * | 11/1971 | Newton | 159/13.4 |
| 3,684,093 | A * | 8/1972 | Kono et al. | 210/788 |
| 3,951,624 | A | 4/1976 | Snader | |
| 4,026,683 | A | 5/1977 | Snader et al. | |
| 4,218,225 | A * | 8/1980 | Kirchhoff et al. | 96/32 |
| 4,257,793 | A | 3/1981 | Kimishima et al. | |

(Continued)

FOREIGN PATENT DOCUMENTS

JP    55-79061 A  *  6/1980  .................. 55/426

*Primary Examiner*—Richard L Chiesa
(74) *Attorney, Agent, or Firm*—Sayed Kaveh E. Rashidi-Yazd, Esq.; Ryan A. Schneider, Esq.; Troutman Sanders LLP

(57) ABSTRACT

The present invention provides systems and methods for organic particulate filtration. An organic particulate filtration system is implemented within a fossil fuel power plant combustion system. The filtration system comprises a gas flow, in which gas are entrained particulates. The filtration system has a collection hopper located proximate a precipitator collection area. Within the collection hopper, a particulate baffle is provided in a downward-angled orientation. The particulate baffle is enabled to trap particulate, such as organic particulate, in the collection hopper, thereby preventing particulate re-entrainment in the gas flow.

20 Claims, 11 Drawing Sheets

U.S. PATENT DOCUMENTS

| | | |
|---|---|---|
| 4,532,871 A | 8/1985 | Van Gasselt et al. |
| 4,891,052 A | 1/1990 | Belin et al. |
| 4,968,330 A | 11/1990 | Wolf et al. |
| 4,992,085 A | 2/1991 | Belin et al. |
| 5,009,677 A | 4/1991 | Wolf et al. |
| 5,809,909 A | 9/1998 | Hoskinson |
| 5,972,061 A * | 10/1999 | Nykyforuk .................. 55/423 |
| 5,976,224 A | 11/1999 | Durant et al. |
| 6,095,095 A | 8/2000 | Alexander et al. |
| 6,447,580 B1 * | 9/2002 | Ridgeway et al. .............. 96/30 |
| 6,709,476 B2 * | 3/2004 | Kitano et al. ................. 55/396 |
| 2002/0066262 A1 * | 6/2002 | Oh .............................. 55/337 |
| 2005/0194244 A1 | 9/2005 | Merrell et al. |
| 2006/0080947 A1 * | 4/2006 | Lee et al. ...................... 55/426 |
| 2006/0137314 A1 * | 6/2006 | Conrad et al. ................. 55/426 |
| 2008/0257148 A1 * | 10/2008 | Klemm .......................... 95/57 |

* cited by examiner

SYSTEMS AND METHODS FOR ORGANIC PARTICULATE FILTRATION

CROSS REFERENCE TO RELATED APPLICATION

This application claims benefit, under 35 U.S.C. §119(e), of U.S. Provisional Application Ser. No. 60/912,992, filed 20 Apr. 2007, the entire contents and substance of which is hereby incorporated by reference.

BACKGROUND

1. Field of the Invention

The present invention relates to fossil fuel power plant emissions and, more particularly, to filtering organic particulate from the emissions of a fossil fuel power plant.

2. Description of Related Art

Fossil fuel power plants are energy conversion centers that combust fossil fuels to produce electricity. A fossil fuel power plant converts the chemical energy stored in fossil fuels such as coal, fuel oil, or natural gas into thermal energy, then mechanical energy, and finally electrical energy for distribution and use. A modern and efficient fossil fuel power plant is capable of cleanly and efficiently converting a large percentage of the chemical energy stored in fossil fuels into electrical energy.

The majority of fossil fuel power plants in the U.S. rely on the combustion of coal. It is the object of the energy conversion process to convert as much of coal's chemical energy into electrical energy. Achieving minimal loss in the energy conversion process is crucial to the success of the power plant for many reasons, especially in light of new and more restrictive environmental regulations and the rising costs of fossil fuels.

Clean and efficient power production for coal fired power plants depends in large part upon the ability of the system to combust a high percentage of the coal inputted into the process. The efficiency of coal combustion is measured in terms of Loss on Ignition ("LOI"). LOI refers to the percentage of unburned carbon outputted from the combustion process. The unburned carbon equates to unburned, wasted fuel, and thus increased operating costs. Therefore, it is a goal for a coal fired power plant to keep the LOI percentage as close to zero as possible. It will be understood by those of skill in the art that a LOI of zero is a theoretical limit, as there will always be some loss due to a number of factors, including furnace design, type of fuel, and operating conditions. For most power plant systems, plant operators strive to achieve a LOI of less than ten percent (10%).

In addition to the desire to minimize LOI, it is important to be able to control the emissions of the coal combustion process, such control is necessary to limit the emission of pollutants, and to meet environmental guidelines and requirements. The coal fired combustion process creates numerous by-products, or off-products, in addition to the primary product of heat. The combustion process produces certain gas and solid emissions. These emissions are primarily contained in the fly ash output of the combustion process. The solid matter emissions are typically solid particulate by-products of coal combustion, which are entrained in fly ash. The solid particulate is comprised of both inorganic components and organic components. The inorganic components often include silicon dioxide ($SiO_2$), aluminum oxide ($Al_2O_3$) and iron oxide ($Fe_2O_3$). The organic components are primarily carbon derivatives. These carbon derivatives most often take the form of soot and char. Soot and char are unburned fuel residues composed mainly of amorphous carbon.

The conventional means for filtering particulate from the emissions of the coal combustion process is to use electrostatic precipitators. An electrostatic precipitator is a particulate collection device capable of removing particles from flowing gas using the force of an induced electrostatic charge. An electrostatic precipitator has a negative voltage energy field and a positive voltage energy field. In practice, the flowing gas passes first through the negative voltage energy field, and the solid particulate is negatively charged. Then the flowing gas passes through the positive voltage energy field, and thus the negatively charged solid particulate matter is attracted to, and collected on, a positively charged collecting plate.

To be effective, the solid particulate must be capable of accepting the negative charge and maintaining that charge for a sufficient time while migrating from the negatively charged field to the positively charged field. In many instances, the solid particulate must have an electrical resistivity between the range of approximately $10 \times 10^5$ to $10 \times 10^{11}$ ohm-centimeters (ohm-cm) to effectively collect and dissipate the charge.

Particulate with too low a resistive value will charge very quickly, but then discharge as soon as it leaves the negative voltage energy field. Thus, such particulate will not be attracted to the positively charged collection plate by the time the particulate migrates to an area proximate the plate. Particulate with too high a resistive value will charge very slowly or essentially not charge, and thus not be attracted to the collection plate when flowing in the area proximate the plate. Thus, if the fly ash contains particulate of an improper electrical resistivity, then a large percentage of that particulate will not be filtered from the fly ash by the electrostatic precipitator and will potentially be permitted to exit the system as undesirable emissions.

Conventional electrostatic precipitators are effective and efficient at filtering the particulate that exhibits an electrical resistivity in the appropriate range, such as the inorganic components of the fly ash particulate. Conventionally electrostatic precipitators, however, are relatively ineffective in filtering the organic components of the fly ash particulate. The organic components are comprised primarily of carbon, which is an electrical conductor, and thus, the organic components do not exhibit the necessary electrical resistivity to be effectively filtered by the electrostatic precipitator.

The problem of unfiltered particulate is exacerbated when the LOI levels of a combustion system increase. The conductive carbon can lower the resistivity levels of combined particulate matter, and thus the percentage of unfiltered particulates in general can increase. Increased particulate emissions can be detrimental to the power plant and can possibly exceed the allowable emissions limits. Power plants that exceed regulatory emission levels can be subject to fines, restrictions, and other detrimental measures.

Not only are certain levels of carbon emission potentially detrimental to the environment and in violation of environmental regulations, they are also highly visible emissions. Carbon particulate emissions have a high opacity and, therefore, create an objectionable stack appearance. Carbon particulate emissions are primarily dark particles and are high in surface area, making these particles more visible in the atmosphere. Thus, the opacity of these carbon emissions can detrimentally affect both the environment and the public's perception of the power plant. In addition to meeting environmental regulations, power plant operators desire to remain in good standing with their surrounding community, and thus strive to limit opaque emissions from the stacks of the plant.

The methods and systems disclosed in the prior art do not provide a filtering system that will enable users to efficiently and effectively filter organic particulate from combustion system emissions. Therefore, a need exists for such a system exists.

SUMMARY

Briefly described, various embodiments of the present invention provide systems and methods for organic particulate filtration. In an exemplary embodiment, an organic particulate filtration system is implemented within a fossil fuel power plant combustion system. The fossil fuel power plant combustion system has a collection container, or hopper, located proximate a precipitator collection area. Within the container, a retaining member is provided in a generally downward-angled orientation. The retaining member can be a particulate baffle. The particulate baffle can trap entrained particulate in the container.

In one aspect, the filtration system can include a collection assembly. The collection assembly can comprise the container and the retaining member. The container can be adapted to contain media, such as organic and inorganic particulates. The container can have at least one side wall. The retaining member can have first and second sections. The first section can extend along the side wall of the container, and the second section can extend into the interior of the container. The second section of the retaining member can be adapted to reduce the amount of media that would otherwise exit the container.

These and other objects, features and advantages of the present invention will become more apparent upon reading the following specification in conjunction with the accompanying drawing figures.

DETAILED DESCRIPTION

Figure 1:
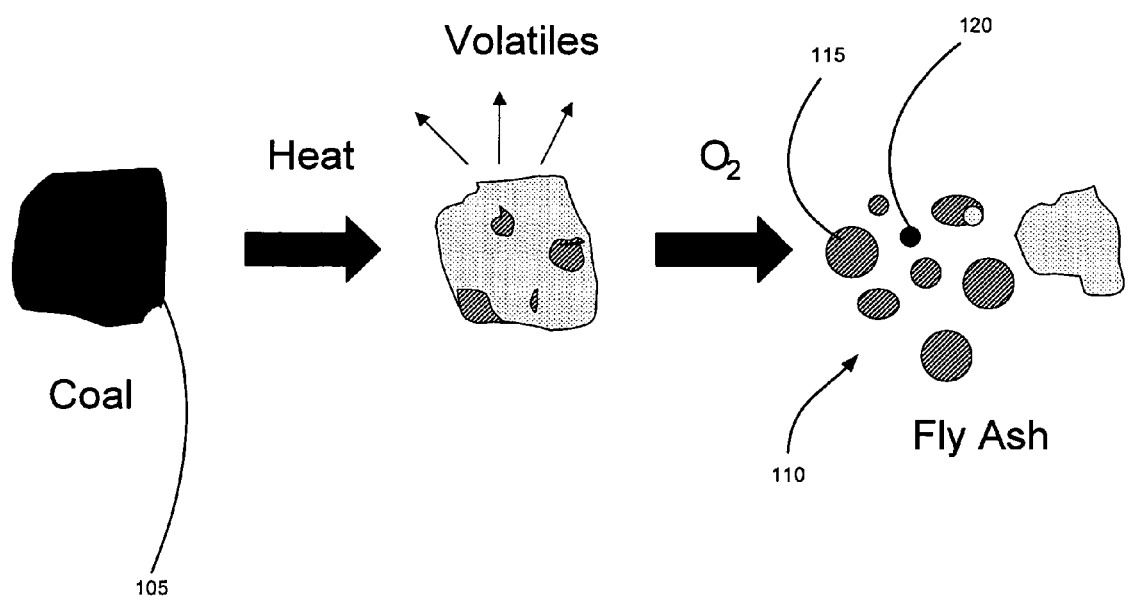
FIG. 1 illustrates various stages coal and its by-products go through in a coal fired power plant combustion system.

To facilitate an understanding of the principles and features of the invention, it is explained hereinafter with reference to its implementation in an illustrative embodiment. In particular, the invention is described in the context of being an organic particulate filtration system for a power plant. Embodiments of the invention, however, need not be implemented in a power plant but can be used whenever a combustion process can generate residual organic components. For example and not limitation, embodiments of the invention can be used in, or in conjunction with, heavy oil fire utility boilers that burn crude oil, or biomass units that burn pulp wood or bark.

The components described hereinafter as making up the various elements of the invention are intended to be illustrative and not restrictive. Many suitable components that would perform the same or a similar function as the components described herein are intended to be embraced within the scope of the invention. Such other components not described herein can include, but are not limited to, for example, components that are developed after development of the invention.

Referring now to the figures, wherein like reference numerals represent like parts throughout the figures, the present systems and methods for organic particulate filtration will be described in detail.

FIG. 1 depicts various stages that coal and its by-products go through in a power plant combustion system. Initially, coal 105 is the input to the system. The coal 105 is usually processed into fine coal particles to enhance the combustion of the coal 105 and promote more complete burning of the coal 105. Once input into the combustion chamber, the chemical energy of the coal 105 is released as heat. Additionally, the by-products of the combustion of the coal 105 are released from the chamber in fly ash 110. These by-products in the fly ash 110 can include both inorganic particulate 115 and organic particulate 120. The inorganic particulate 115 can typically include silicon dioxide ($SiO_2$), aluminum oxide ($Al_2O_3$) and iron oxide ($Fe_2O_3$). The organic particulate 120 is primarily composed of carbon derivatives. These carbon derivates most often take the form of soot and char. Soot and char are the unburned fuel residues composed mainly of amorphous carbon.

Figure 2:
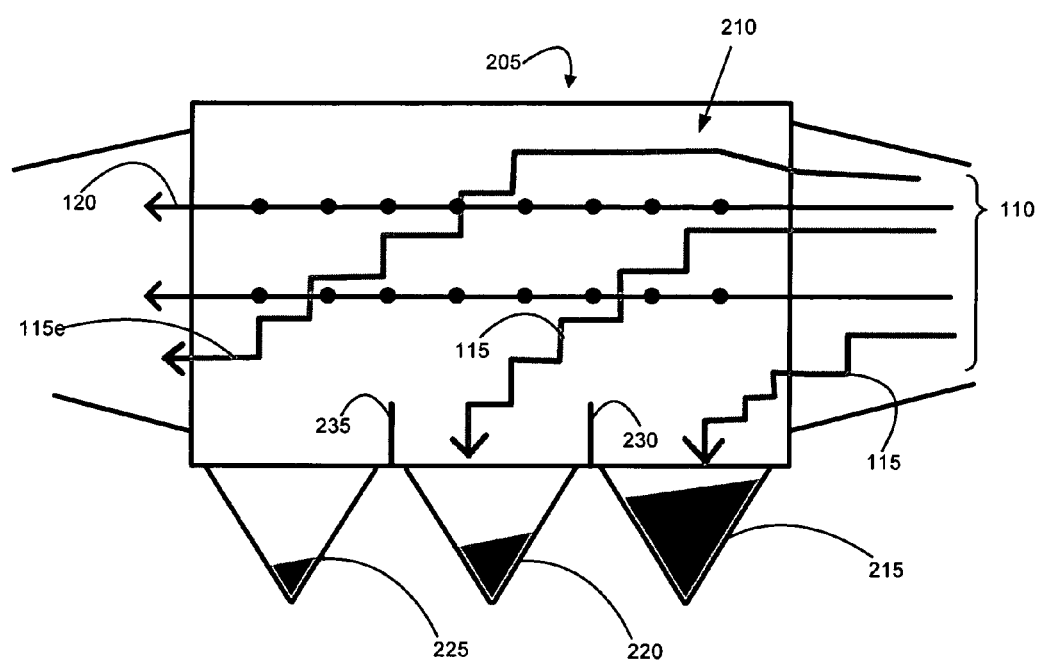
FIG. 2 illustrates an estimate of the flow pathway in the prior art for the entrained particulate of fly ash in a filtration system of the coal fired power plant combustion system.

Upon discharge from the combustion chamber, the fly ash 110 containing both inorganic particulate 115 and organic particulate 120 can be processed by a filtration system 205 (see FIG. 2). An exemplary purpose of the filtration system 205 is to filter out the particulates 115 and 120, and thus limit or even prevent the emission of the particulates 115 and 120 by the coal fired power plant. As one skilled in the art would appreciate, conventional filtration systems are known in the art, and can suffice to serve as bases for exemplary embodiments of the present invention.

An estimate of the flow pathway for the entrained particulate of the fly ash 110 in the filtration system 205 of the coal fired power plant combustion system is shown in FIG. 2. In some embodiments, the filtration system 205 can include a collection mechanism for collecting particulate matter into containers, which containers can be hoppers 215, 220, and 225. The collection mechanism can utilize an electrostatic precipitator 210. Electrostatic precipitators 210 filter particulate by biasing the particulate entrained in a gas with a charge, and then collecting the particulate in an energy field biased with an opposing charge. Entrained particulate flowing through the electrostatic precipitator 210 can first be negatively charged, and then migrate to and collect upon a positively charged collection apparatus, collection surface, or collection plate 305 (see FIG. 3). The particulate can collect on the collection plate into a dust cake or cohesive cake. The dust cake will remain on the collection plate until a physical force is applied to the plate to release or remove it.

Figure 3:
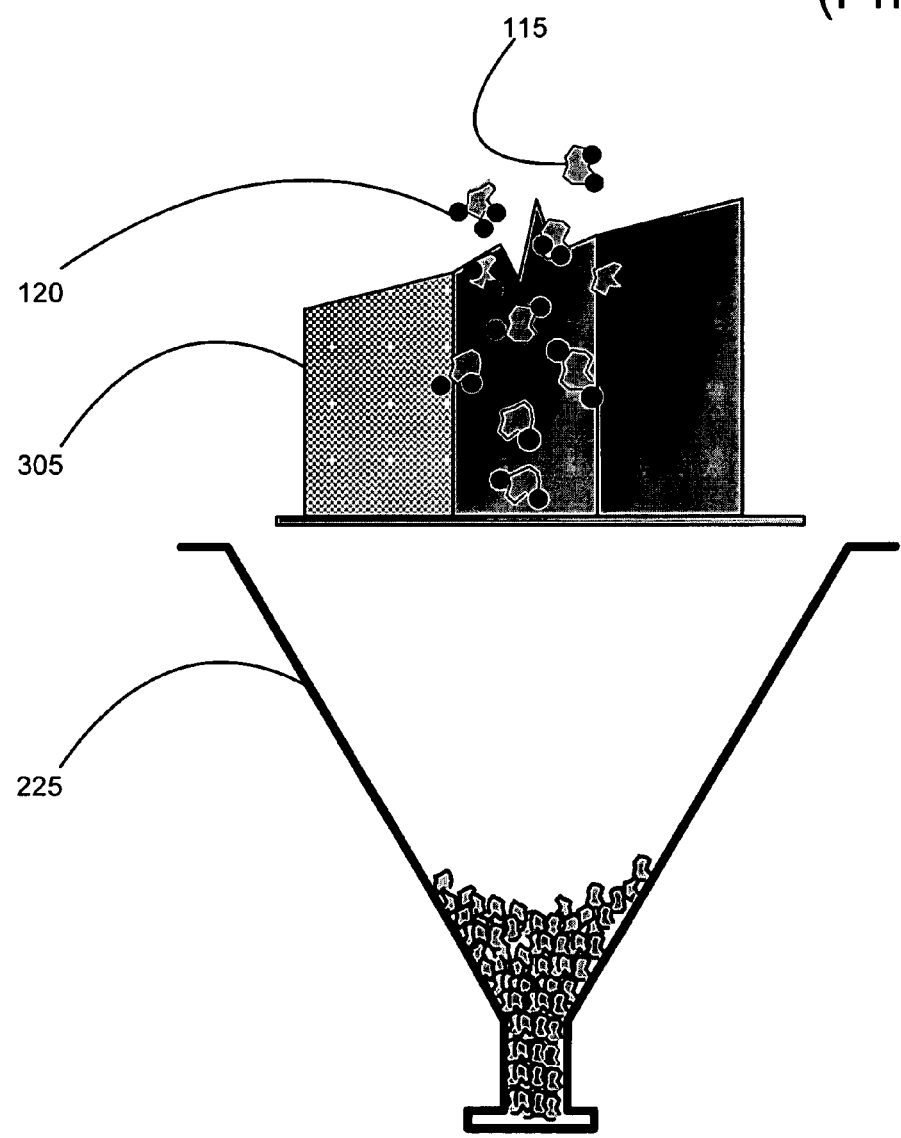
FIG. 3 illustrates the behavior of particulates in the conventional filtration system.

Referring now to FIGS. 2-3, it is desired to remove the dust cake matter from the collection plate in a manner that does not induce separation or degradation of the dust cake. If the dust cake is excessively vibrated or shaken, it will break into pieces, and the particulate can be re-entrained in the flowing gas of the filtration system 205. In an exemplary embodiment, the dust cake can be released by rapping the collection surface 305. Upon release from the collection surface 305, the dust cake can fall into the collection hoppers 215, 220, and 225 located beneath the electrostatic precipitator 210. At least one collection hopper is provided, but the electrostatic precipitator can implement a plurality of collection hoppers 215, 220, and 225.

The particulates 115 and 120 filtered by the electrostatic precipitator 210 can ultimately descend into the hoppers 215, 220, and 225, which are positioned generally beneath the collection plates 305 of the electrostatic precipitator 210. Those of skill in the art would appreciate that the filtration system 205 could be implemented in a variety of ways without detracting from the scope of this description.

The inorganic particulate 115 is understood to migrate through the electrostatic precipitator 210 in essentially a descending pathway. A significant portion of the inorganic particulate 115 can collect on the collection plate 305 and descend into the first collection hopper 215. A portion of the remainder of the inorganic particulate 115 can descend at a slower pace in the flow pathway and be collected in the second collection hopper 220. Further still, a portion of the remainder of the inorganic particulate 115 can descend at an even slower place in the flow pathway and be collected in the third collection hopper 225. Also, a percentage of the entrained inorganic particulate 115e can exit the filtration system 205.

Conventional filtration systems 205 have utilized various techniques in an attempt to efficiently and effectively filter inorganic particulate 115 and organic particulate 120 from the fly ash 110. One of the methods conventionally used is referred to as skewed flow. Skewed flow attempts to improve the performance of the electrostatic precipitators in the filtration system 205. Skewed flow can be implemented to alter the direction of the gas flow in either an ascending manner or a descending manner. The skewed flow essentially increases the time of exposure of both the inorganic particulate 115 and the organic particulate 120 to the electronic precipitator 210. Additionally, the skewed flow methodologies attempt to decrease the velocity of the flue gas in the lower portions of the filtration system 205. While this methodology can improve filtration with respect to inorganic particulate 115, it is generally ineffective against organic particulate 120.

Referring now to FIG. 2, an additional conventional approach for improved particulate filtration is to provide walkway baffles. The walkway baffles 230 and 235 can be positioned between each of the collection hoppers 215, 220, and 225. Those of skill in the art would appreciate that the walkway baffles 230 and 235 are an exemplary embodiment and can be implemented in a variety of different ways. For example, the walkway baffles 230 and 235 can be placed at various other locations in the filtration system 205 and can embody various orientations beyond normal to the floor of the system 205. Further, a number of walkway baffles can be implemented in the filtration system 205.

The walkway baffles 230 and 235 can limit the crosswise flow of gas generally in the lower regions of the filtration system 205. The walkway baffles 230 and 235, also assist to limit the disturbance of the dust cake in the collection hoppers 215, 220, and 225. As with the skewed flow methodologies, walkway baffles can improve filtration with respect to inorganic particulate 115, but are generally ineffective against organic particulate 120. Thus, none of the conventional filtration methodologies are effective with respect to limiting the amount of organic particulate 120 exiting the system 205.

For many reasons, it is highly undesired to emit organic particulate 120 containing carbon from the stacks of the coal fired power plant. Certain levels of carbon are considered pollutants, and thus it is desired to minimize carbon emissions. Additionally, carbon emissions are added to the mass count for a power plant's regulated discharge. Exceeding allowed emission mass count levels can lead to fines and even suspension of a power plant's operations. Furthermore, as the organic particulate 120 can contain a significant percentage of carbon, the emission of organic particulate 120 from the coal fired power plant combustion system is highly undesired. The high opacity of the carbon particles of the organic particulate 120 is visible upon emission from the stacks of the coal fired power plant. Additionally, such organic particulate 120 emissions can contribute to or exceed the regulatory emission limits for a coal fired power plant.

The ineffectiveness of the conventional filtration methods in removing organic particulate 120 is increasingly problematic in light of recent changes to the operation of many coal fired power plants. The Clean Air Act Revision of 1990, 42 U.S.C. §7401 et seq., provides tight restrictions on nitrous oxide emissions. In order to meet these restrictions, many power plants have implemented modifications to their processes to delay the emission point of the combustion system and extend the burnout period of the ignited fuel in the furnace. The goal of these modifications is to extract the same amount of thermal energy from the coal fuel, but to do it at lower flame temperatures to minimize the creation of excess nitrogen oxide. These modifications have been successful at lowering the nitrous oxide emissions of many plants, but, at the same time, these modifications have resulted in an increase in LOI. More specifically, the changes to reduce nitrous oxide have increased the levels of unburned carbon fuel released from the combustion system. As organic particulate 120 is often primarily comprised of carbon, it is thus increasingly important to enable efficient and effective filtration of this organic particulate 120.

In the late 1990s and early 2000s, certain power plants were experiencing high LOI as a result of compliance technology for nitrous oxide reduction, which technology is often referred to as Lonox. High carbon production in flue gas was result of use of Lonox burners. More recently, the industry seeks to reduce mercury emissions, and to that end, carbon is introduced into the system. As carbon is effective at absorbing radical metals such as mercury, it is also effective at reducing mercury emissions. Because carbon is now being introduced into the system, the need to reduce carbon emissions becomes even more imperative.

As noted, traditional methods of particulate filtration have proven unsuccessful at adequately reducing carbon emissions. This has previously been thought to result from the failure of organic particulate 120 to collect on the collection plate of the electrostatic precipitator 210 and the failure to make it into the collection hoppers. Conventionally, it was assumed that the majority of the organic particulate 120 migrated through the electrostatic precipitator 210 in essentially a horizontal path, as depicted in FIG. 2. It was also assumed that the conductive nature of the organic particulate 120 prevented it from retaining a charge, and thus being collected by the electrostatic precipitator 210. Additionally, it was assumed that the lightweight nature of the organic particulate 120 impeded its decent into the collection hoppers by gravity. Thus, as depicted in FIG. 2, the lightweight and conductive organic particulate 120 was believed to essentially flow straight through the electrostatic precipitator 210.

Close observation and analysis of the behavior of the particulate during the filtration process illustrates that the previous assumption with respect to the flow pathway of the organic particulate 120 in the filtration system 205 is incorrect. Studies have illustrated that indeed a large percentage of the organic particulate 120 in the fly ash 110 is collected in the dust cake that builds up upon the positive collection plates of the electrostatic precipitator 210.

FIG. 3 is an illustration of the behavior of the particulate in the filtration system 205. As shown, the entrained particulate can collect into a dust cake on the collection plate 305 of the electrostatic precipitator 210. The dust cake contains both organic particulate 120 and inorganic particulate 115, due to the agglomeration of the particulates. Agglomeration can occur when particles join together either by electrical or physical means. Therefore, the organic particulate 120 does not simply migrate in a lateral fashion through the electrostatic precipitator 210 grid, as depicted in FIG. 2, but an amount can collect on the collection plate 305 as depicted in FIG. 3.

Upon collection on the collection plate 305, the organic particulate 120 and inorganic particulate 115 agglomeration in the dust cake can descend into the collection hopper 225. The particulate that is successfully collected in the collection hopper 225 can be extracted from the filtration system 205 and thus prevented from contributing to the emissions of the combustion system. Trapped particulates may be evacuated by a vacuuming system. Alternatively, the trapped particulates 115 and 120 can be flushed by gravity or by a water system out of the collection hopper 225. Conventional means, however, have been unsuccessful in effectively extracting this collected organic particulate 120 from the filtration system 205.

Figure 4:
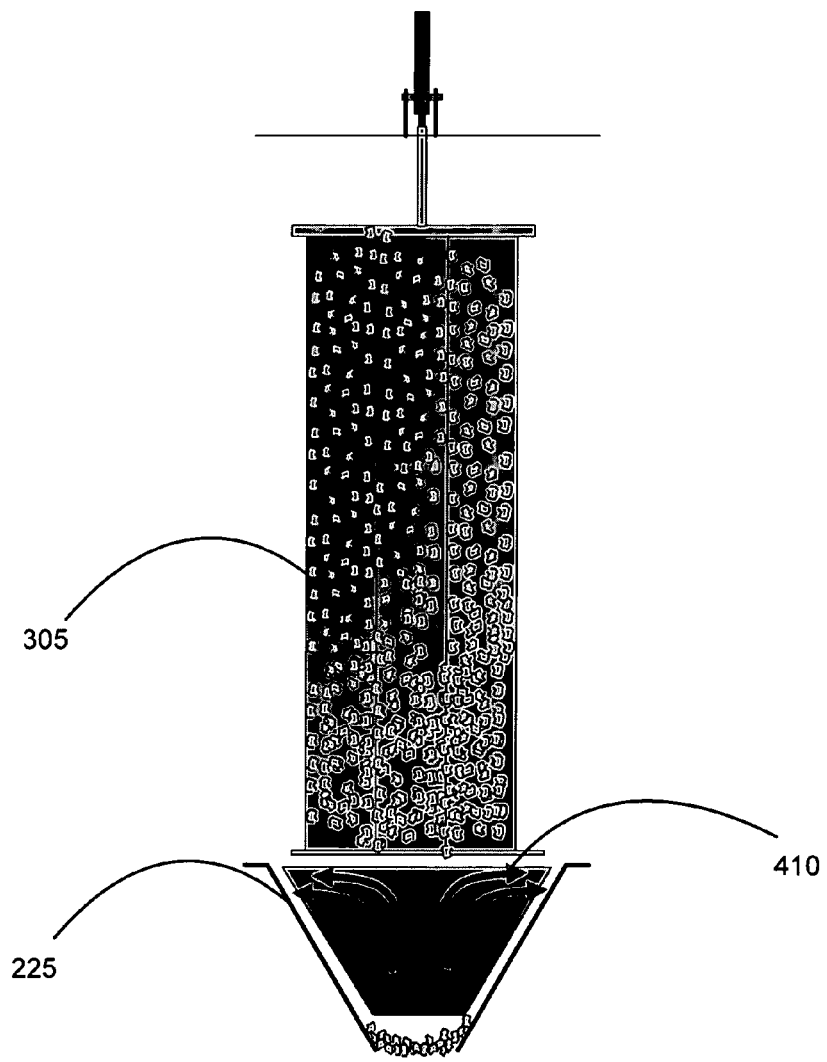
FIG. 4 illustrates the migration of dust cake matter into a collection hopper, as conventionally understood.

FIG. 4 is an illustration of the migration of the dust cake matter into the collection hopper. As shown in FIG. 4, the collection hopper 225 is located generally beneath the collection plate 305, such that when a releasing physical force is applied to the collection plate 305, the dust cake matter can be permitted to descend into the collection hopper 225. When the organic particulate 120 and the inorganic particulate 115 contained in the dust cake matter fall into the collection hopper 225, the solid matter inserted into the collection hopper 225 displaces an equivalent volume of gas 410 contained in the collection hopper 225. The displaced gas exiting the collection hopper 225 is reintroduced into the filtration system 205, and may ultimately exit the filtration system 205.

Figure 5:
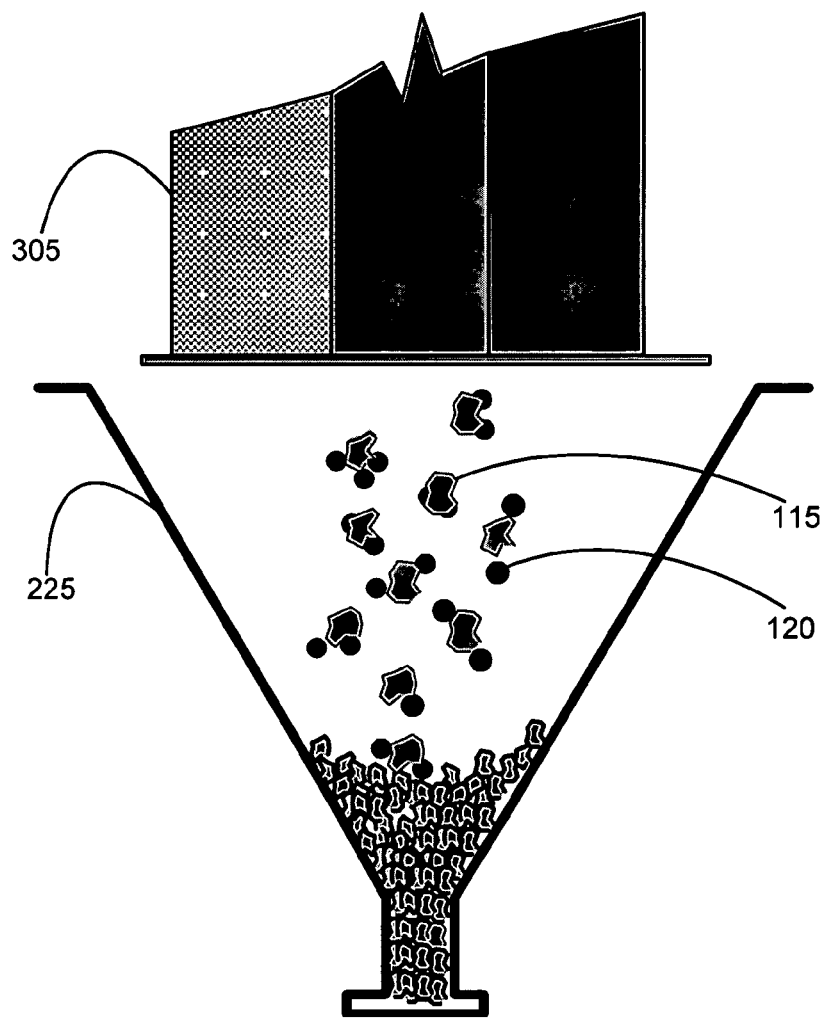
FIG. 5 illustrates a more detailed view of the migration of the dust cake matter into the collection hopper, as conventionally understood

FIG. 5 is a further illustration of the migration of the dust cake matter into the collection hopper. As illustrated in FIG. 5, the dust cake matter that falls from the collection plate 305 to the collection hopper 225 is an agglomerated combination of both inorganic particulate 115 and organic particulate 120. The agglomeration of the particles in the dust cake can break apart upon the descent into the collection hopper 225. Portions of the lighter organic particulate 120 can separate from portions of the heavier inorganic particulate 115. The inorganic particulate 115 can descend to the bottom of the collection hopper 225 and the organic particulate 120 can be re-entrained in the gas contained in the collection hopper 225. The organic particulate 120 can then be re-entrained in the displaced gas and be forced out of the collection hopper 225 by the insertion of the dust cake. Dependent upon the structure of the filtration system 205, the re-entrained organic particulate 120 can be permitted to exit the filtration system 205 and be emitted from the combustion system.

Figure 6:
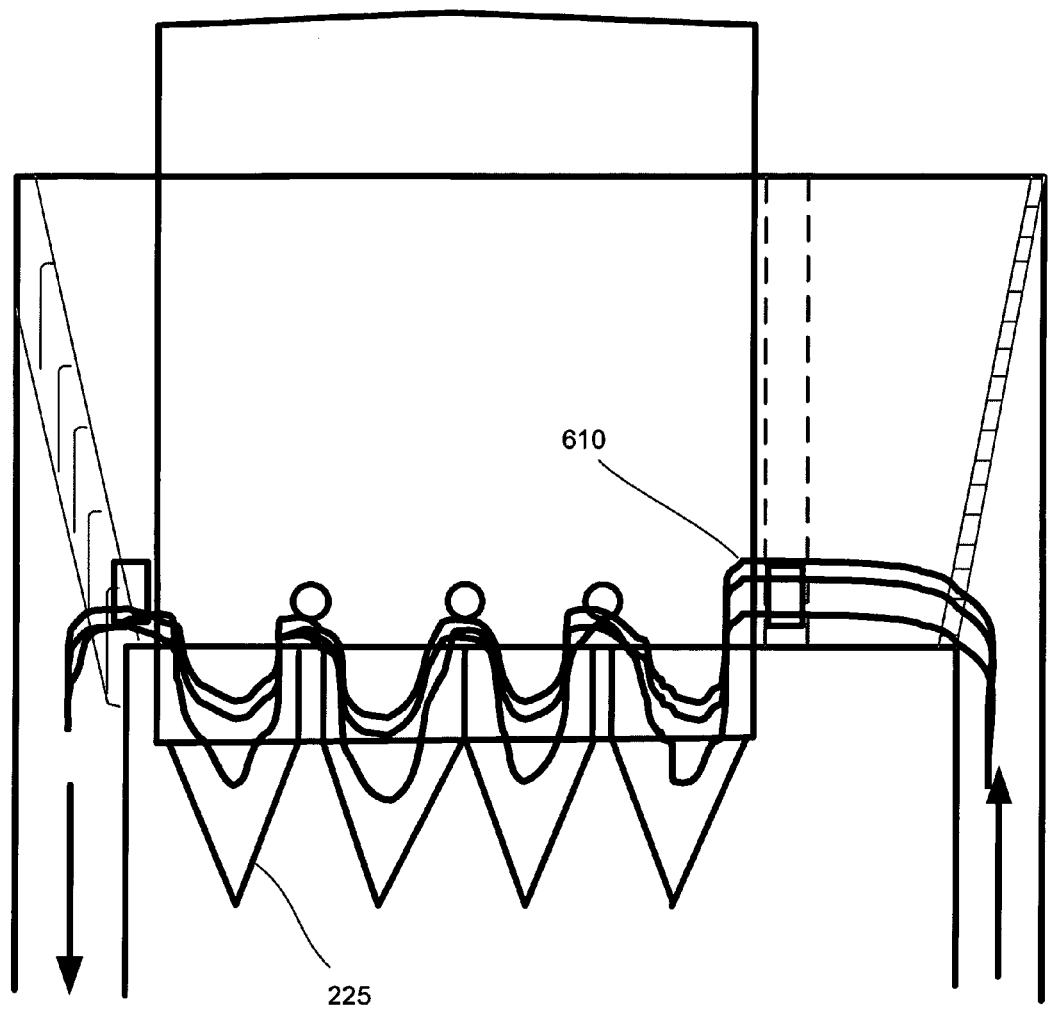
FIG. 6 illustrates an exemplary gas flow pathway through the conventional filtration system.

FIG. 6 illustrates gas flow 610 through the filtration system 205 without the use of baffles. More specifically, FIG. 6 illustrates an elevation cross-section of a typical precipitator 210. Gas flows upward from an inlet duct, over the hoppers, and then downward and out. Gas flows in and out of the hoppers, and as the gas flows, it can sweep particulates out of the hoppers. This flow of gas through the hoppers can disturb the collected particulate, thereby allowing the particulate to be re-entrained. Baffles are used to avoid this occurrence.

Figure 7:
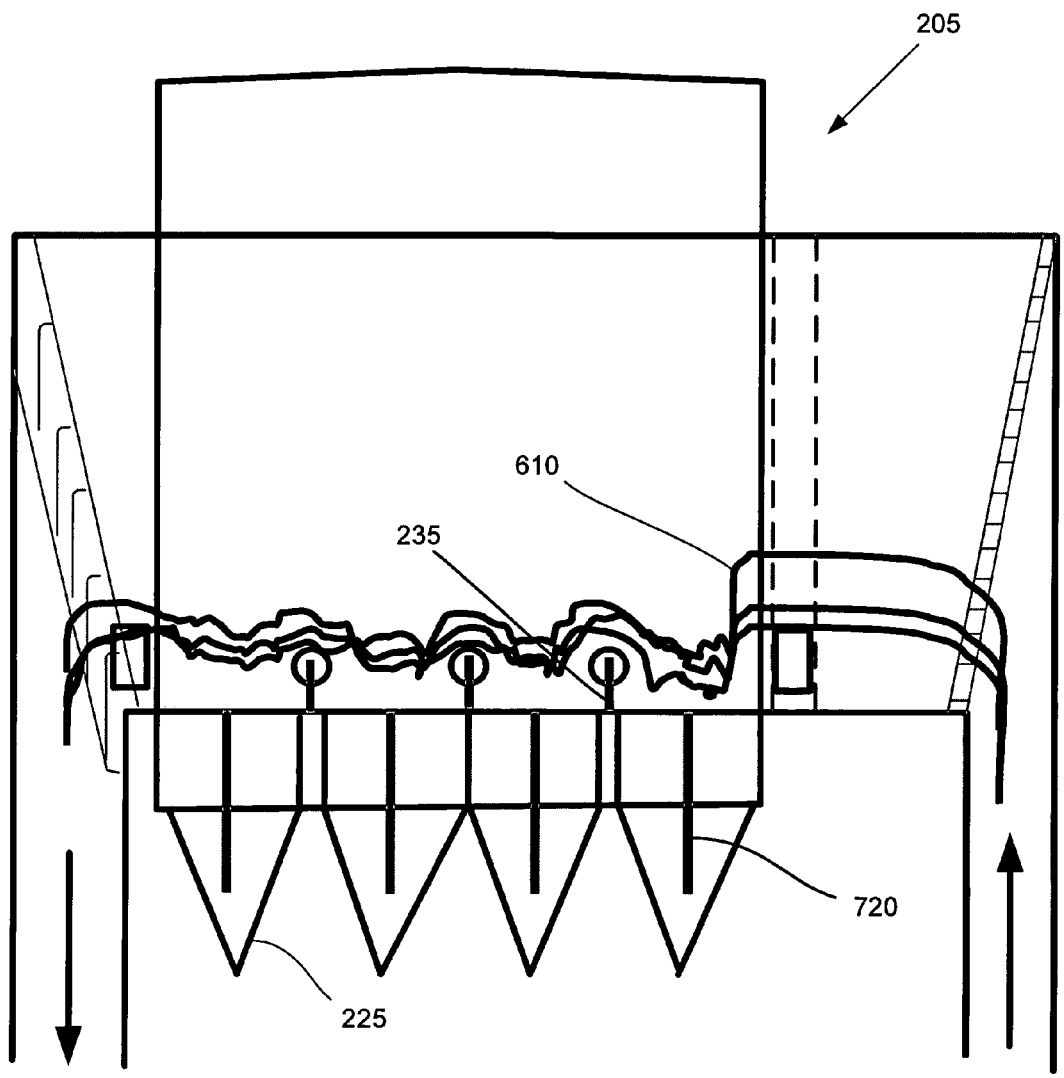
FIG. 7 illustrates an exemplary gas flow pathway through the conventional filtration system with use of walkway baffles and hopper baffles.

FIG. 7 illustrates gas flow 610 through the filtration system 205 when conventional baffles, walkway baffles 235 and hopper baffles 720, are used. Walkway baffles 235 and hopper baffles 720 limit gas flow 610 through the filtration system 205. Through use of these baffles 235 and 720, gas flow 610 through the hoppers 215, 220, and 225 is limited, thereby reducing the disturbance of the dust cakes and of ash collected in the hoppers 215, 220, and 225.

Walkway baffles 235 can be positioned, i.e. generally hang, above and between the hoppers or, alternatively, can extend partially into the hoppers 215, 220, and 235. The walkway baffles 235 can be static or dynamic. If static, the baffles 235 can stay rigidly in place, resisting allowance of gas flow 610. If dynamic, the walkway baffles 235 can swing, thereby encouraging movement throughout the filtration system 205 though still limiting gas flow. Hence, through use of dynamic walkway baffles 235, gas flow 610 is limited along the walkways, but is still permitted to some degree. The swing baffles 235 allow gas to flow through the baffles 235, thereby encouraging continuous movement throughout the system 205 and allowing particulates to continue to move through the system 205 and be trapped in succeeding hoppers.

As illustrated in FIG. 7, the filtration system 205 can also comprise hopper baffles 720. The hopper baffles 720 can be at least partially disposed in the hoppers. That is, they can extend at least partially into the hoppers. Optionally, a hopper baffle 720 can be dynamic or can comprise a dynamic portion toward its lower end. The dynamic portion can swing in a manner similar to that of the dynamic walkway baffles 235. Like the walkway baffles 235, the hopper baffles 720 limit gas flow 610 proximate the hoppers 215, 220, and 225, thereby limiting disturbance of collected particulate.

Figure 8:
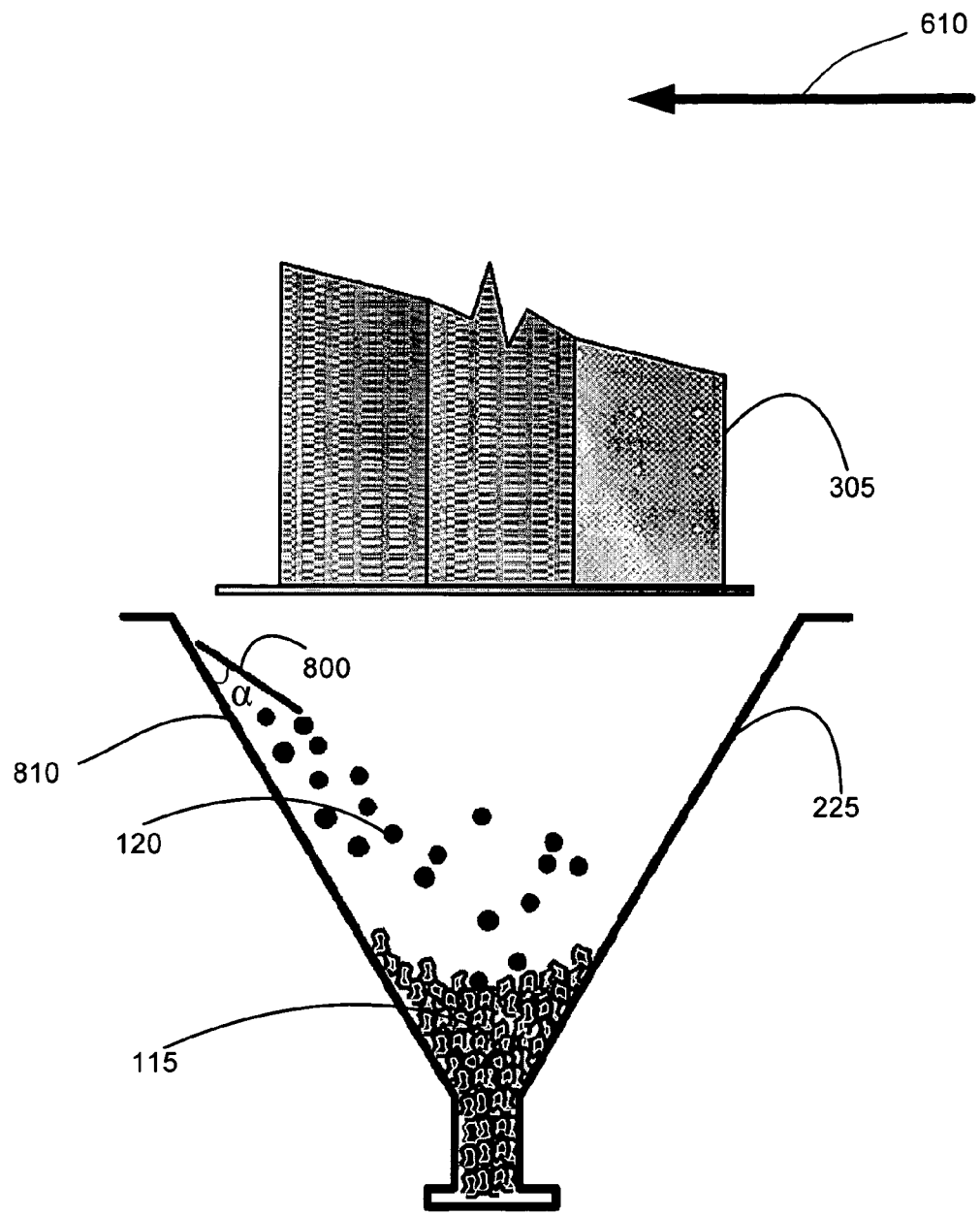
FIG. 8 illustrates a side view of a particulate baffle, in accordance with an exemplary embodiment of the present invention.

FIG. 8 is an illustration of a retaining member, or particulate baffle 800, such as an organic particulate baffle or carbon baffle, in accordance with an embodiment of the present invention. The particulate baffle 800 can reduce the amount of media, such as particulates 115 and 120 flying within the hopper 225. The particulate baffle 800 can be in communication with the hopper 225, which can have many shapes. Generally, the shapes can include conical or pyramidal.

The particulate baffle 800 can be connected to the hopper 225 in many ways. For example and not limitation, the particulate baffle 800 can be welded to the hopper 225 or, alternatively, can be pivotably connected to the hopper 225. One or more particulate baffles 800 may be provided per hopper 225. The particulate baffle 800 can be located in the hopper 225 on a downstream portion of the hopper 225, with respect to the gas flow 610.

Again, the particulate baffle 800 can be an extending member or a restraining member in communication with the hopper 225. To minimize the release of the organic particulate 120, a particulate baffle 800 is provided within the collection hopper 225. The particulate baffle 800 can point inwardly and slightly downwardly to counteract the effect of some of the upwardly moving particulates 115 and 120. At a minimum, the baffle can counteract the effect of upwardly moving organic particulate 120. The baffle 800 can be placed on the downstream wall 810 of all the hoppers 215, 220, and 225 (see FIG. 2), or the downstream wall 810 of the last hopper 225 in a flow pathway series of hoppers. The particulate baffle 800 can be used in conjunction with conventional baffles, such as the walkway baffles 235 and hopper baffles 720 (as previously described and known in the art).

One skilled in the art would appreciate that carbon particulate 120 is much lighter than typical fly ash. Indeed, carbon particulate 120 can be up to six times lighter. Therefore, less flow velocity is required to stir up the carbon particulate 120, causing it to rise out of the hopper 225 and be re-entrained. Carbon particulate 120 is more difficult to capture than heavier, inorganic materials, and because of its dark color when emitted, it may be more important to capture carbon particulate 120 than inorganic particulate. Those of skill in the art would recognize that, when carbon is trapped by the filtration system 205, other particles, such as mercury, absorbed by or otherwise associated with the carbon, can be trapped and filtered along with the carbon.

Unlike the walkway baffles 235 and hopper baffles 720, the particulate baffle 800 directs particulate and not gas flow. The particulate baffle 800 is appropriately positioned to trap an amount of the re-entrained organic particulate 120 in the collection hopper 225. The relatively lightweight carbon making up organic particulate 120 that is re-entrained in the displaced gas comes into contact with the particulate baffle 800 and is effectively trapped in the collection hopper 225. Thus, the particulate baffle 800 prevents the escape of at least a portion of the re-entrained organic particulate 120 from the collection hopper 225. As shown in FIG. 8, the inorganic particulate 115 collects at the bottom of the collection hopper 225 and typically is not re-entrained into the displaced gas of the collection hopper 225.

Still referring to FIG. 8, the particulate baffle 800 is positioned at a downward angle. More specifically, the particulate baffle 800 can create an acute angle $\alpha$ between the particulate baffle 800 and portions beneath the baffle 800 on the wall 810 of the collection hopper 225. The acute angle $\alpha$ of the particulate baffle 800 enables the baffle 800 to most efficiently trap the re-entrained organic particulate 120. The angle $\alpha$ can be between approximately 20 and 60 degrees and is preferably 40 degrees with respect to the wall 810. While the organic particulate 120, and specifically the carbon particulate, is relatively low in density, it has sufficient inertia to be trapped by the particulate baffle 800. When the displaced gas rushes along the walls of the collection hopper 225 to exit the collection hopper 225, the gas flows into and then around the particulate baffle 800.

Notably, the flow of displaced gas can create an eddy current, which then captures the organic particulate 120 in the wake of the eddy current. More specifically, the centrifugal force of the organic particulate 120 can cause the organic particulate 120 to be trapped by the particulate baffle 800 when the displaced gas flows rapidly around the particulate baffle 800.

Once the organic particulate 120 has been removed from the displaced gas exiting the collection hopper 225, it descends back down into the collection hopper 225. From there, the organic particulate 120 can be removed with the other particulate contained in the collection hopper 225 and thereby prevented from re-entering the filtration system 205 and potentially contributing to the emissions of the coal power plant combustion system.

The particulate baffle 800 provides an efficient and effective method for filtering organic particulate 120 from the emissions of the combustion system. Not only is the particulate baffle 800 fairly inexpensive to install, it is also passive and thus does not import significant operational costs to implement and maintain.

Figure 9:
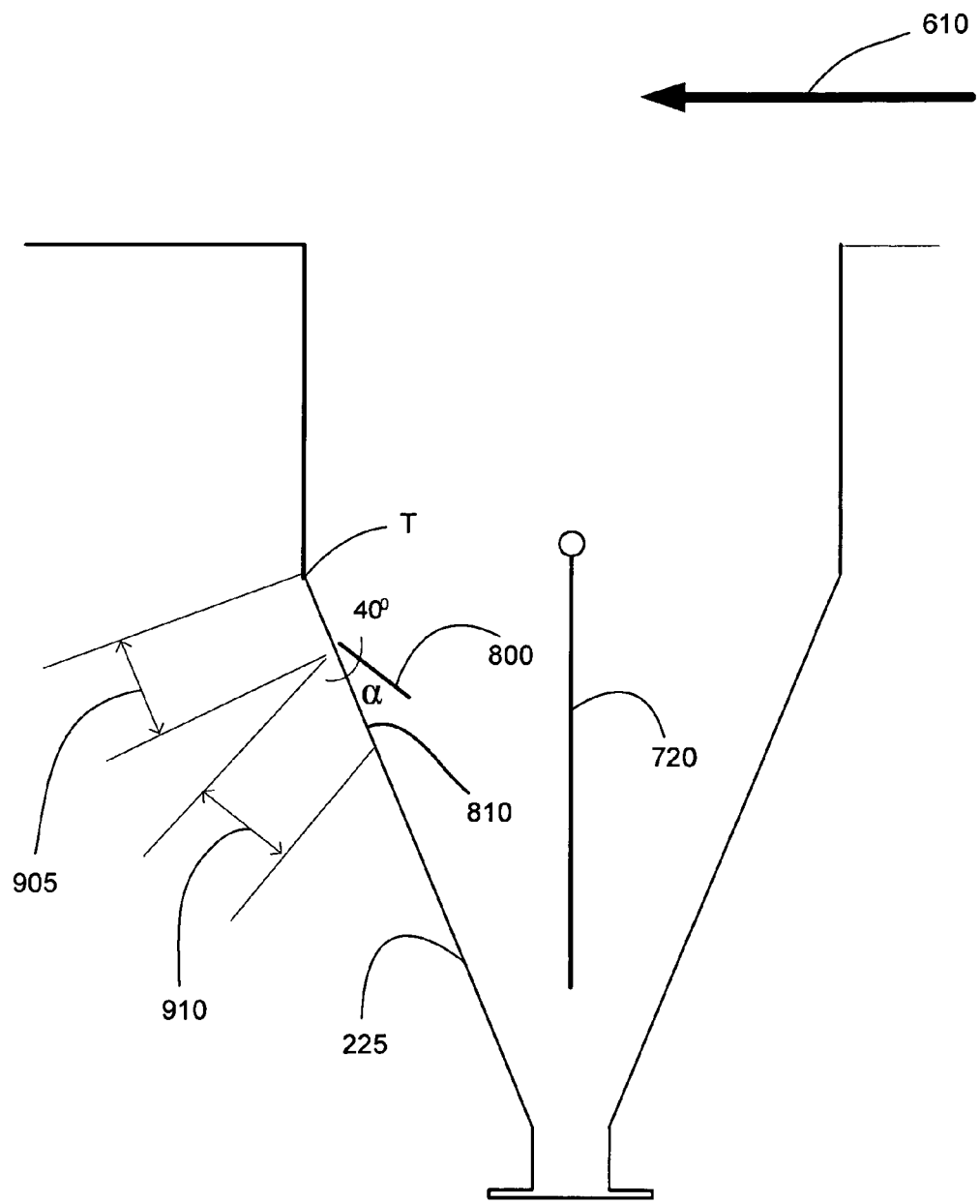
FIG. 9 illustrates a side view of another particulate baffle, in accordance with an exemplary embodiment of the present invention.

FIG. 9 is an illustration of an exemplary embodiment of the particulate baffle. As shown in FIG. 9, the particulate baffle 800 can be mounted a predetermined distance below a top T of the collection hopper 225. The particulate baffle 800 can be mounted on the wall 810 of the collection hopper 225 and located in the hopper 225 on a downstream portion of the hopper 225 with respect to the gas flow 610 (see FIGS. 6-9). For instance, the baffle 800 can be mounted at a distance of approximately 18 inches 905 below the top T of a downstream portion of the inwardly slanted interior wall of the collection hopper 225.

As the collection hopper 225 is at ground potential, the particulate baffle 800 must be positioned sufficiently far away from the collection plate 305 to prevent an electrical short circuit. In an embodiment in which the collection plate 305 is positively charged, an electrical arc could form between the particulate baffle 800 and the collection plate 305 if they are not positioned far enough away from each other.

The particulate baffle 800 can be of varying lengths depending upon the parameters of the collection hopper 225 in which it is implemented. Thus, the dimensions of the particulate baffle 800 can be adjusted to correspond to the dimensions of the collection hopper 225. It is desired for a portion of the particulate baffle 800 to extend far enough into the open body of the collection hopper 225 so as to sufficiently interrupt the flow of gas to inhibit organic particulate 120 release from the hopper, while not fully impeding gas flow. In some embodiments the length 910 of the particulate baffle 800 can range from approximately one to four feet. Exemplarily, the particulate baffle 800 can be approximately 18 inches long.

In addition to the length 910 of the particulate baffle 800, the angle $\alpha$ of the particulate baffle 800 can vary depending upon the parameters of the collection hopper 225 in which it is implemented. It is desired for the particulate baffle 800 to be positioned with a sufficient downward angle to ensure that the descent of the dust cake into the collection hopper 225 is not impeded, while at the same time, still enabling the interruption in the flow of gas exiting the collection hopper. In other words, the particulate baffle 800 can be positioned such that dust cake does not collect upon the upper surface of the particulate baffle 800. In some embodiments, the particulate baffle 800 is positioned at angle between 20 and 60 degrees from the wall of the collection hopper 225. The particulate baffle 800 can be positioned at an angle $\alpha$ of approximately 40 degrees from the wall of the collection hopper 225.

In addition to the particulate baffle 800, the collection hopper 225 can also contain another baffle in the center of the collection hopper 225, i.e. the hopper baffle 720. This hopper baffle 720 is conventionally provided in a majority of collection hoppers to prevent the flowing gas in the filtration system 205 from removing the dust cake matter from the collection hopper 225. Typically, the hopper baffle 720 is used to decrease the velocity of the gas flowing through the collection hopper 225. Without the hopper baffle 720, the flowing gas of the filtration system 205 can re-entrain the particles gathered in the collection hopper 225 and defeat the effectiveness of the filtration system 205.

Figures 10A, 10B:
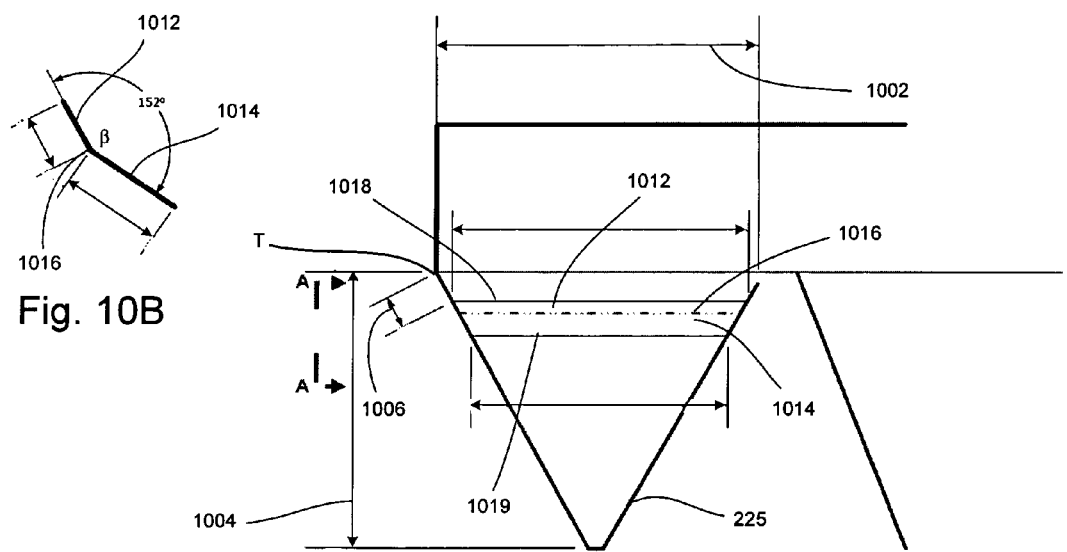
FIG. 10A illustrates a lateral view of the collection hopper, in accordance with an exemplary embodiment of the present invention.
FIG. 10B illustrates a cross-sectional view across cross-line A-A of FIG. 10A of a particulate baffle.

FIG. 10A illustrates a lateral view of the collection hopper 225, in accordance with an exemplary embodiment of the present invention. In the perspective of FIG. 10A, gas flow would be directed into or out of the page. For example and not limitation, at its upper opening, the hopper 225 can be approximately 14 feet 6⅜ inches wide 1002, and the hopper 225 can be approximately 12 feet 3 inches tall 1004. In a hopper 225 of these dimensions, the particulate baffle 800 can be removed from the top T of the hopper 225 by a distance 1006 of approximately 18 inches. The particulate baffle 800 can comprise an extension with a first section 1012 and a second section 1014, which sections 1012 and 1014 can be in communication with each other. The sections 1012 and 1014 can be distinct parts connected together at a joint 1016, or alternatively, they can comprise a single piece bent at the joint 1016. In FIG. 10A, the dashed line represents the joint 1016 in the particulate baffle 800. The first section 1012 of the particulate baffle 800 can extend along the an inner surface, such as the side wall 810, of the hopper 225. Optionally, the first section 1012 can be welded along this side wall 810 of the hopper 225, or it can be pivotably connected to the side wall 810. The second section 1014 can extend or protrude into the hopper 225.

FIG. 10B illustrates a cross-sectional view across crossline A-A of FIG. 10A of the particulate baffle 800. A first section 1012 of the particulate baffle 800, adjacent to the side wall 810 of the hopper 225, can be approximately 6 inches long. The second section 1014 of the baffle 800 can be approximately 18 inches long, and can be removed from the side wall 810 of the hopper 225 by an acute angle. The joint 1016 can comprise an obtuse angle between the first 1012 and second 1014 sections, which angle β, at these dimensions, can be between approximately 120 degrees and 160 degrees. In one example, the angle β between the two sections 1012 and 1014 can be approximately 152 degrees.

The first section 1012 can extend along the hopper wall 810, and the second section 1014 can extend into the interior of the hopper 225. In that case, the angle between the hopper wall 810 and the second section 1014 of the extension can be approximately supplementary to the angle between the two sections 1012 and 1014. These specific angles, however, are not required.

Referring back to FIG. 10A, the particulate baffle 800 can be approximately 13 feet 4¹¹⁄₁₆ inches wide at its upper edge 1018, which upper edge is attached to the hopper side. The baffle 800 can be approximately 11 feet 7⅝₁₆ inches wide on its lower edge 1019.

With these specifications, the particulate baffle 800 can block a significant portion of carbon particulate 120 from escaping the hopper 225 and, therefore, from escaping the filtration system 205 as emissions. Those of skill in the art would recognize that these dimensions are illustrative and that any dimensions in these proportions or in other proportions that will serve the same or similar function, may be used. When the dust cake drops into the hopper 225 and carbon particulate 120 is forced upward, the particulate baffle 800 can block much of this particulate 120 from escaping the hopper 225. As a result, carbon particulate 800 can be more successfully filtered from the system and the emission of such trapped carbon particulate 800 is avoided.

The particulate baffle 800 can be composed of steel or another alloy. In an exemplary embodiment, the particulate baffle 800 is made of carbon steel. Additionally, the particulate baffle 800 can be of varying thicknesses. The particulate baffle 800 is rigid enough to withstand the heavy pressures applied in the collection hopper 225 by the incoming dust cake and the escaping displaced gas. For example and not limitation, the particulate baffle 800 can range in thickness from approximately ¼ inch to 1 inch. As illustrated in FIGS. 10A-10B, the particulate baffle 800 can be approximately ⅛ inch thick. The particulate baffle 800 can be installed and implemented in the manner shown in FIGS. 10A-10B or in a variety of other manners or dimensions.

Figure 11:
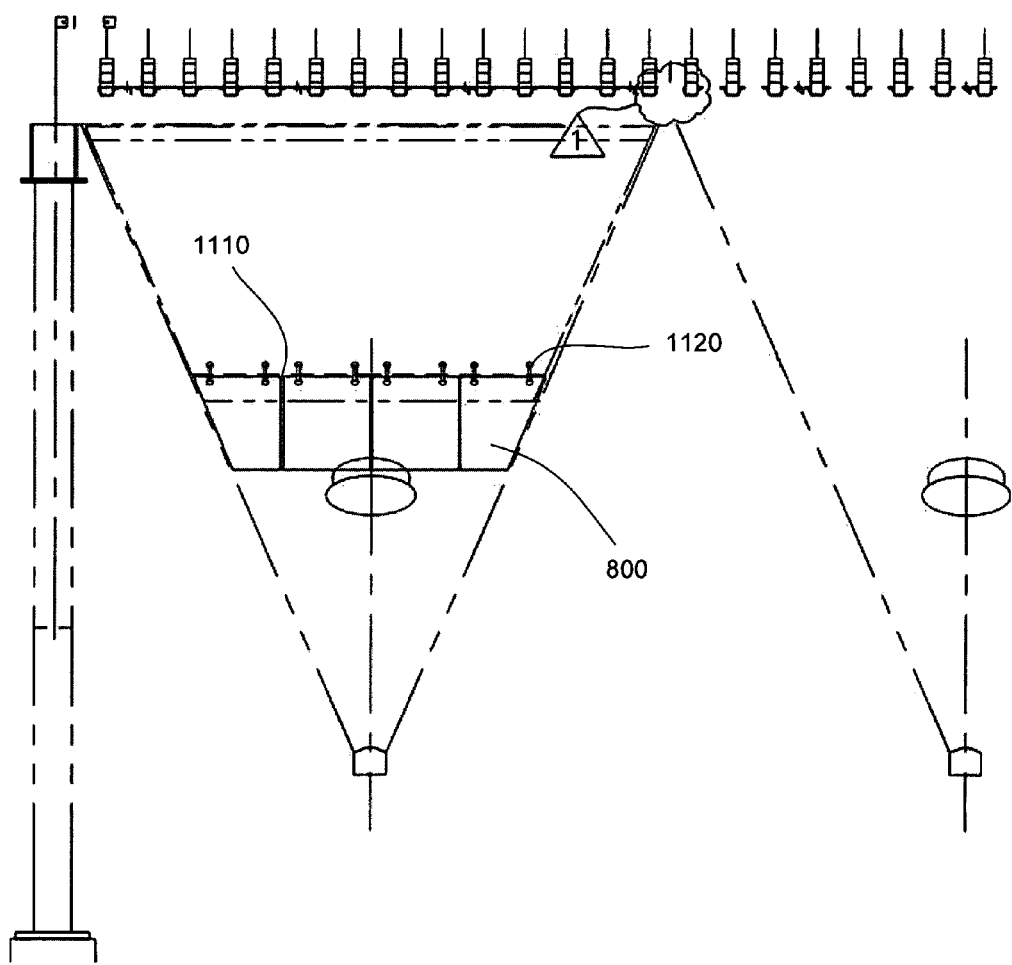
FIG. 11 illustrates a cross sectional view of the particulate baffles in the filtration system.

FIG. 11 illustrates another embodiment of the particulate baffle 800 used in conjunction with the hopper 225. FIG. 11 illustrates the particulate baffles 800 by means of a lateral cross-sectional view of the filtration system 205. In the perspective of FIG. 11, gas flow (not shown) is directed into the page. The embodiment depicted in FIG. 11, is an illustration of a site specific installation of the particulate baffle 800. Those of skill in the art would appreciate that the dimensions of the particulate baffle 800 and the surrounding environment can be altered without departing from the scope of the invention. The particulate baffles 800 depicted in FIG. 11 are dynamic swing baffles. These particulate baffles 800 can be approximately 29 inches long. In an alternative embodiment, the swing baffles 235 can be longer or shorter in dimension.

An extending member 1110, or extending line or wire, can extend from one side of the filtration system 205 to the other. One or more particulate baffles 800 can extend downwardly from the extending member 1110. As shown, the particulate baffled 800 can be dynamic. They can be attached to the extending member 1110 by means of chain links 1120 or by some other means that allows the baffles 800 to swing or pivot relative to the extending member 1110. When particulates 115 and 120 are forced upward, the particulate baffles 800 can swing, thereby increasing the angle between the baffles 800 and the side wall 810 of the hopper 225. When the particulate baffles 800 swing upward, they can trap particulates 115 and 120 in the hopper 225.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A collection assembly in a filtration system, the collection assembly comprising:
   a container for containing media, the container having at least one interior side wall; and
   a retaining member having a first retaining member section and a second retaining member section, the first retaining member section attached to the side wall of the container and configured to extend along and substantially parallel to the side wall, the second retaining member section extending from the first retaining member section into the interior of the container and away from the side wall of the container;
   wherein the retaining member is positioned on a downstream portion of the container with respect to a gas flow through the filtration system.

2. The collection assembly of claim 1, wherein the retaining member is adapted to reduce an amount of media that exits the container, when media collected by the filtration system is dropped into the container.

3. The collection assembly of claim 1, further comprising a collection apparatus adapted to collect the media and deliver the media to the container.

4. The collection assembly of claim 1, wherein an angle between the first retaining member section and second retaining member section is between approximately 120 degrees and 160 degrees.

5. The collection assembly of claim 1, wherein the first retaining member section and the second retaining member section are distinct pieces in communication with each other.

6. The collection assembly of claim 1, wherein the media comprises organic particulate released during a combustion process.

7. The collection assembly of claim 1, the first retaining member section and the second retaining member section being integral with each other.

8. The collection assembly of claim 1, the side wall being angled inwardly where attached to the first retaining member section.

9. A filtration system comprising:
   a plurality of particulates entrained in a flow of a medium;
   a collection mechanism for collecting at least some of the particulates; and
   a first container adapted to contain the particulates after collection; and
   a retaining member pivotably coupled to an inner surface of the first container, the retaining member connected to the inner surface so that at least a portion of the retaining member extends away from the inner surface into the interior of the first container in a downward direction, and the retaining member adapted to reduce the re-entrainment of the particulates in the flow.

10. The filtration system of claim 9, the retaining member comprising a first retaining member section and a second retaining member section, the first retaining member section extending along the inner surface of the container, and the second retaining member section extending into the first container at an angle with respect to the first section.

11. The filtration system of claim 9, further comprising a second container adapted to contain the particulates after collection, the first container located downstream of the second container in a pathway of the flow.

12. The filtration system of claim 9, the retaining member having a first section extending along the inner surface substantially parallel to the inner surface, and the retaining member having a second section extending from the first section into the interior of the first container, wherein both the first and second sections of the retaining member are moveable relative to the inner surface.

13. The filtration system of claim 9, the retaining member adapted to swing such that the downward angle between the retaining member and the inner surface changes as the retaining member swings.

14. The filtration system of claim 9, the inner surface being a curved surface.

15. The filtration system of claim 9, further comprising:
   an electrostatic precipitator adapted to charge the media;
   a collection apparatus adapted to receive the media after the media has been charged; and
   a releasing mechanism adapted to release the media into the container.

16. The filtration system of claim 9, the first container further comprising a wide portion and a narrow portion, the wide portion being wider than the narrow portion, and the inner surface having an intermediate section tapering inward from the wide portion to the narrow portion of the first container, wherein the retaining member is connected to the intermediate section of the inner surface.

17. A method for filtering particulates generated during a combustion process, the method comprising:
   collecting particulates into a container, the container having at least one side wall, and the side wall having a tapering section that tapers between a top portion of the container and a bottom portion of the container, wherein the top portion is wider than the bottom portion; and
   reducing the loss of particles from the container with a retaining member, the retaining member coupled to the tapering section of the side wall of the container and extending downwardly and inwardly from the side wall into the container, wherein the retaining member is configured to impede upward flow of media.

18. The method of claim 17, wherein the retaining member comprises a first retaining member section and a second retaining member section, the first retaining member section welded to the container along an edge of the first retaining member section and extending downward along the inwardly extending sidewall, and the second retaining member section extending from the first retaining member section and protruding into the container.

19. The method of claim 17, the retaining member connected to the side wall at an angle between 20 degrees and 60 degrees from the side wall.

20. The method of claim 17, the collecting further comprising:
   providing an electrostatic precipitator adapted to charge the media;
   accumulating the media in a collection apparatus after the media has been charged; and
   releasing the media into the container.

* * * * *